US012802955B2

(12) United States Patent
Liu et al.

(10) Patent No.: US 12,802,955 B2
(45) Date of Patent: Nov. 17, 2026

(54) DYNAMIC EJECTION DELAY TIME FOR ACOUSTIC EJECTION MASS SPECTROMETRY

(71) Applicant: DH Technologies Development Pte. Ltd., Singapore (SG)

(72) Inventors: Chang Liu, Richmond Hill (CA); Hui Zhang, Winchester, MA (US)

(73) Assignee: DH Technologies Development Pte. Ltd., Singapore (SG)

(*) Notice: Subject to any disclaimer, the term of this patent is extended or adjusted under 35 U.S.C. 154(b) by 368 days.

(21) Appl. No.: 18/258,359

(22) PCT Filed: Dec. 22, 2021

(86) PCT No.: PCT/IB2021/062200
§ 371 (c)(1),
(2) Date: Jun. 20, 2023

(87) PCT Pub. No.: WO2022/137172
PCT Pub. Date: Jun. 30, 2022

(65) Prior Publication Data

US 2024/0038518 A1 Feb. 1, 2024

Related U.S. Application Data

(60) Provisional application No. 63/128,940, filed on Dec. 22, 2020.

(51) Int. Cl.
*H01J 49/04* (2006.01)
*H01J 49/00* (2006.01)

(52) U.S. Cl.
CPC ...... *H01J 49/0454* (2013.01); *H01J 49/0031* (2013.01)

(58) Field of Classification Search
CPC ............... H01J 49/0404; H01J 49/0031; H01J 49/0454; H01J 49/0431
See application file for complete search history.

(56) References Cited

U.S. PATENT DOCUMENTS 7,661,289 B1 2/2010 Jhutty et al.
7,923,681 B2 4/2011 Collings et al.
(Continued)

FOREIGN PATENT DOCUMENTS

CN 107014938 8/2017
WO 2015/122920 8/2015
(Continued)

OTHER PUBLICATIONS

Van Berkel, Gary J., Vilmos Kertesz, and Harry Boeltz. "Immediate drop on demand technology (I-DOT) coupled with mass spectrometry via an open port sampling interface." Bioanalysis 9.21 (2017): 1667-1679 (Year: 2017).*
(Continued)

*Primary Examiner* — Wyatt A Stoffa

(57) ABSTRACT

A method of ejecting a plurality of samples from a well plate includes receiving a first sample intensity prediction associated with a first sample in a first well of the well plate. A second sample intensity prediction associated with a second sample in a second well is also received. The second sample intensity prediction is less than the first sample intensity prediction. An ejection time delay value for a subsequent analysis of the first sample and the second sample is determined, based at least in part on the second sample intensity prediction. Thereafter, the first sample is acoustically ejected from the first well, and the second sample is acoustically ejected from the second well.

8 Claims, 11 Drawing Sheets

(56) References Cited

U.S. PATENT DOCUMENTS

| | | | | |
|---|---|---|---|---|
| 9,153,425 | B2 | 10/2015 | Van Berkel | |
| 9,632,066 | B2 | 4/2017 | Van Berkel | |
| 10,325,768 | B1 * | 6/2019 | Stearns | H01J 49/0454 |
| 10,755,910 | B2 * | 8/2020 | Cooks | G01N 27/62 |
| 10,770,277 | B2 | 9/2020 | Datwani et al. | |
| 11,927,565 | B2 * | 3/2024 | Badeau | G01B 17/02 |
| 12,488,974 | B2 * | 12/2025 | Liu | H01J 49/0454 |
| 2005/0130257 | A1 * | 6/2005 | Mutz | B01D 15/3866 435/61 |
| 2006/0210443 | A1 * | 9/2006 | Stearns | G01N 35/1074 422/400 |
| 2016/0299041 | A1 | 10/2016 | Kertesz et al. | |
| 2019/0157059 | A1 * | 5/2019 | Jones | H01J 49/16 |
| 2019/0157060 | A1 * | 5/2019 | Datwani | H01J 49/0454 |
| 2019/0157061 | A1 | 5/2019 | Datwani et al. | |
| 2019/0232275 | A1 | 8/2019 | Forbush | |
| 2021/0090867 | A1 * | 3/2021 | Datwani | H01J 49/0454 |
| 2021/0121905 | A1 | 4/2021 | Covey et al. | |
| 2022/0148866 | A1 * | 5/2022 | Covey | H01J 49/0431 |
| 2023/0207299 | A1 * | 6/2023 | Covey | H01J 49/0036 250/282 |
| 2024/0290598 | A1 * | 8/2024 | Stearns | H01J 49/0454 |
| 2024/0404807 | A1 * | 12/2024 | Ivosev | H01J 49/0027 |
| 2025/0275031 | A1 * | 8/2025 | Coleman | F21V 14/02 |
| 2026/0235564 | A1 * | 8/2026 | Burton | G01N 30/8693 |

FOREIGN PATENT DOCUMENTS

| | | |
|---|---|---|
| WO | 2021/234643 | 11/2021 |
| WO | 2021/234645 | 11/2021 |
| WO | 2022/0137120 | 6/2022 |
| WO | 2022/0172156 | 8/2022 |
| WO | 2023/0233328 | 12/2023 |

OTHER PUBLICATIONS

Liu, Chang et al., “Fluid Dynamics of the Open Port Interface for High-Speed Nanoliter Volume Sampling Mass Spectrometry”, Analytical Chemistry, vol. 93, No. 24, Jun. 10, 2021, pp. 8559-8567.

Liu, Chang et al., “Operational Modes and Speed Considerations of an Acoustic Droplet Dispenser for Mass Spectrometry”, Analytical Chemistry, vol. 92, No. 24, Oct. 16, 2020, pp. 15818-15826.

Liu, Chang, “Acoustic ejection mass spectrometry: fundamentals and applications in high-throughput drug discovery”, Expert Opinion On Drug Discovery, vol. 17, No. 7 , May 31, 2022, pp. 775-787.

Zacharias, Adway et al., “Ultrahigh-Throughput Intact Protein Analysis with Acoustic Ejection Mass Spectrometry”, Journal of the American Society for Mass Spectrometry, vol. 34, No. 1, Dec 5, 2022, pp. 4-9.

Hager et al., “Product ion scanning using a Q-q-Q linear ion trap (Q TRAP) mass spectrometer”, Rapid Communications in Mass Spectrometry; 2003; 17: 1056-1064).

O’Haver, Tom, “A pragmatic introduction to signal processing with applications in chemical analysis an illustrated essay with software available for free download”, Aug. 12, 2013, pp. 1-121, retreived online on Apr. 6, 2017 at: https://web-beta.archive.org/web/20130821030141/http://terpconnect.umd.edu/~toh/spectrum/IntroToProcessing.pdf.

PCT International Preliminary Report on Patentability in International Application PCT/IB2021/062200, mailed Jul. 6, 2023, 11 pages.

PCT International Search Report and Written Opinion in International Application PCT/IB2021/062200, mailed Apr. 21, 2022, 19 pages.

Van Berkel, Gray et al., “Immediate drop on demand technology (I-DOT) coupled with mass spectrometry via an open port sampling interface”, Bioanalysis, vol. 9, No. 21, Nov. 2, 2017, pp. 1667-1679.

Zhang, Hui et al., “Acoustic ejection mass spectrometry for high-throughput analysis”, Analytical Chemistry, vol. 93, No. 31, Jul. 28, 2021, pp. 10850-10861.

* cited by examiner

DYNAMIC EJECTION DELAY TIME FOR ACOUSTIC EJECTION MASS SPECTROMETRY

CROSS REFERENCE TO RELATED APPLICATION

This application is a National Stage Application of PCT/IB2021/062200, filed on Dec. 22, 2021, which claims the benefit of U.S. Provisional Application No. 63/128,940, filed on Dec. 22, 2020, the entire disclosures of which are incorporated herein by reference in their entireties. To the extent appropriate, a claim of priority is made to each of the above disclosed applications.

BACKGROUND

High-throughput sample analysis is critical to the drug discovery process. Mass spectrometry (MS) based methods can achieve label-free, universal mass detection of a wide range of analytes with exceptional sensitivity, selectivity, and specificity. As a result, there is significant interest in improving the throughput of MS-based analysis for drug discovery. In particular, a number of sample introduction systems for MS-based analysis have been improved to provide higher throughput. Acoustic droplet ejection (ADE) has been combined with an open port interface (OPI) to provide a sample introduction system for high-throughput mass spectrometry. When an ADE device and OPI are coupled to a mass spectrometer, the system can be referred to as an acoustic ejection mass spectrometry (AEMS) system. The analytical performance (sensitivity, reproducibility, throughput, etc.) of an AEMS system depends on the performance of the ADE device and the OPI. The performance of the ADE device and the OPI depends on selecting the operational conditions or parameters for these devices.

AEMS technology brings fast, precisely controlled, low-volume sampling to the direct highflow liquid transferring to the ESI without carry-over, to achieve this high-throughput analytical platform with high reproducibility, and wide compound coverage. The analytical throughput of an AEMS system is determined by the delay time between ejections from different sampling events, with the consideration of being able to accurately identify and quantify the compounds from the potential interference of adjacent ejections.

SUMMARY

In one aspect, the technology relates to a method of ejecting a plurality of samples from a well plate, the method including: receiving a first sample intensity prediction associated with a first sample in a first well of the well plate; receiving a second sample intensity prediction associated with a second sample in a second well of the well plate, wherein the second sample intensity prediction is less than the first sample intensity prediction; determining an ejection time delay value for a subsequent analysis of the first sample and the second sample, based at least in part on the second sample intensity prediction; acoustically ejecting the first sample from the first well; and after acoustically ejecting the first sample, acoustically ejecting the second sample from the second well. In an example, the method includes receiving the well plate in a mass spectrometry device. In another example, the method includes calculating an adjusted time period, wherein the adjusted time period is based at least in part on a reference time period and the ejection delay time value. In yet another example, acoustically ejecting the second sample is performed after the adjusted time period elapses. In still another example, the method includes receiving a third sample intensity prediction associated with a third sample in a third well of the well plate, wherein the third sample intensity prediction is at least one of greater than and equal to the second sample intensity prediction.

In another example of the above aspect, the method includes, after acoustically ejecting the second sample, acoustically ejecting the third sample from the third well, wherein ejecting the third sample is performed after the reference time period elapses. In an example, the method includes analyzing the first sample, the second sample, and the third sample with the mass spectrometry device to obtain, respectively, a first ion intensity signal, a second ion intensity signal, and a third ion intensity signal. In yet another example, the method includes storing, in a memory coupled to the mass spectrometry device, the first sample intensity prediction with the first ion intensity signal.

In another aspect, the technology relates to a method of ejecting a plurality of samples from a well plate, the method including: acoustically ejecting a first timing sample from a first well of a well plate; analyzing the first timing sample with a mass spectrometry device to determine a first ion intensity signal; subsequent to ejecting the first timing sample, acoustically ejecting a second timing sample from a second well of the well plate; analyzing the second timing sample with the mass spectrometry device to determine a second ion intensity signal, wherein the second ion intensity signal is less than the first ion intensity signal; and determining an ejection time delay value for performing a subsequent analysis of a first analysis sample from the first well and a second analysis sample from the second well based at least in part on the second ion intensity signal. In an example, the method includes calculating an adjusted time period, wherein the adjusted time period is based at least in part on a reference time period and the ejection delay time value. In another example, the method includes: acoustically ejecting the first analysis sample from the first well; and after acoustically ejecting the first analysis sample, acoustically ejecting the second analysis sample from the second well, wherein acoustically ejecting the second analysis sample is performed after the adjusted time period elapses. In yet another example, acoustically ejecting the second timing sample is performed after a timing time period elapses. In still another example, the timing time period is less than the reference time period.

In another example of the above aspect, the method includes: subsequent to ejecting the second timing sample, acoustically ejecting a third timing sample from a third well of the well plate; analyzing the third timing sample with the mass spectrometry device to determine a third ion intensity signal, wherein the third ion intensity signal is at least one of greater than and equal to the second ion intensity signal. In another example, the method includes, after acoustically ejecting the second analysis sample, acoustically ejecting the third analysis sample from the third well, wherein acoustically ejecting the third analysis sample is performed after the reference time period elapses.

In another aspect, the technology relates to a mass analysis instrument including: an open port interface (OPI); a fluid pump configured to pump a transport fluid into the OPI; an electrospray ionization (ESI) source, in fluid communication with the OPI; a detector configured to detect ions emitted from the ESI source; a movable stage for receiving a well plate, wherein the movable stage is configured to selectively align individual wells of the well plate with the OPI; a processor; and memory storing instructions that when executed by the processor cause the mass analysis instrument to perform a set of operations including: with the movable stage positioned at a first position relative to the OPI, acoustically ejecting a first sample from a first well of the well plate; moving the movable stage to a second position relative to the OPI; with the movable stage positioned at the second position relative to the OPI, acoustically ejecting a second sample from a second well of the well plate, wherein a time period between the acoustic ejection of the first sample and the acoustic ejection of the second sample is based at least in part on at least one of a predicted or an actual intensity of the first sample and at least one of a predicted or an actual intensity of the second sample. In an example, the set of operations further includes receiving the predicted intensity of the first sample and the predicted intensity of the second sample. In another example, the set of operations further includes detecting with the detector, in a timing operation preceding the acoustic ejections of the first sample and the second sample, the actual intensity of the first sample and the actual intensity of the second sample. In yet another example, moving the stage includes performing a moving operation and a waiting operation during the time period, wherein the moving operation is longer than the waiting operation. In still another example, moving the stage includes performing a moving operation and a waiting operation during the time period, wherein the moving operation is shorter than the waiting operation.

DETAILED DESCRIPTION

Figure 1:
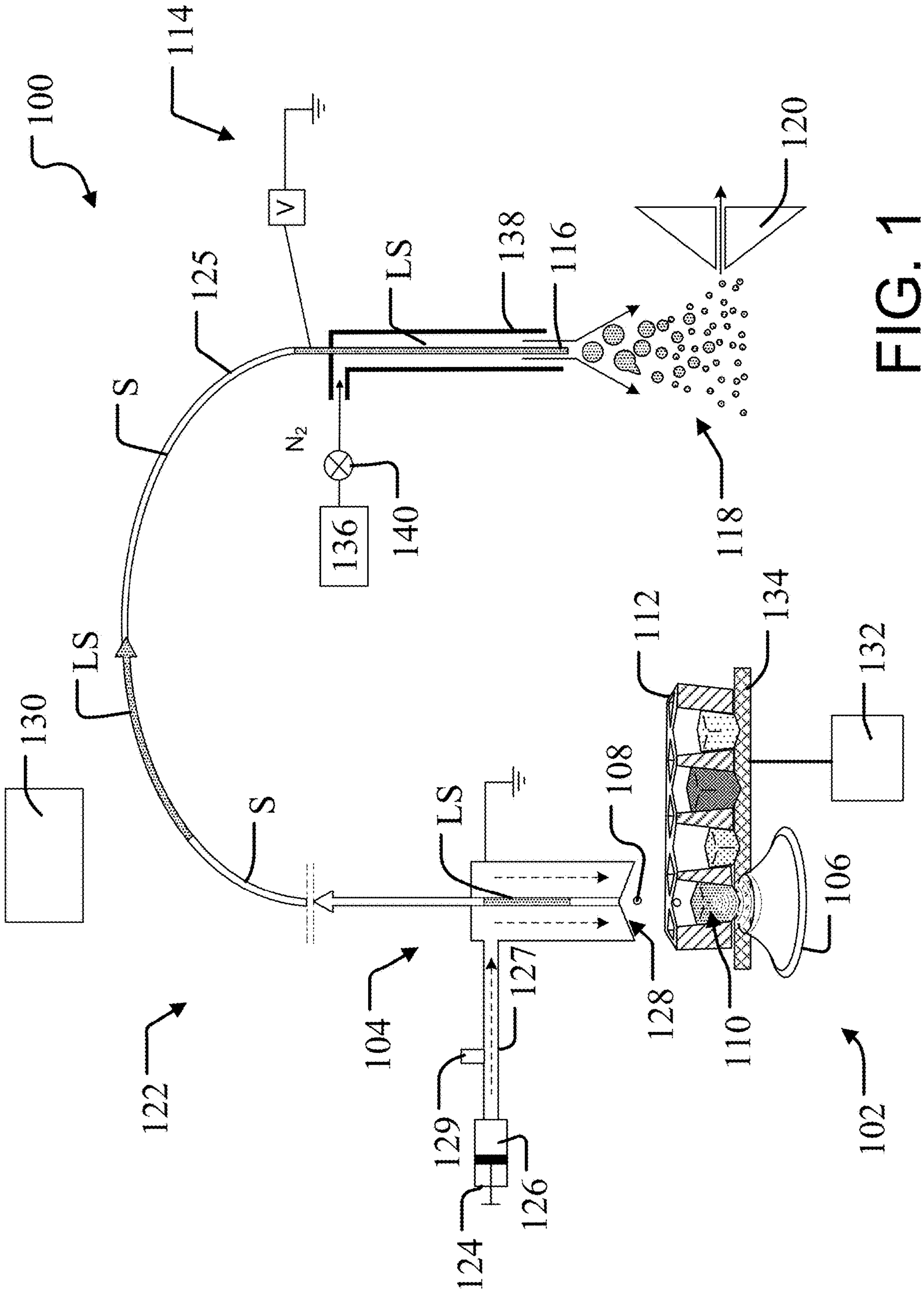
FIG. 1 is a schematic view of an example system combining acoustic droplet ejection (ADE) with an open port interface (OPI) sampling interface and electrospray ionization (ESI) source.

FIG. 1 is a schematic view of an example system 100 combining an ADE 102 with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer probe 138 and electrospray electrode 116 of the ESI source 114, samples ejected therefrom are in the gas phase. A liquid handling system 122 (e.g., including one or more pumps 124 and one or more conduits 125) provides for the flow of liquid from a solvent reservoir 126 to the sampling OPI 104 and from the sampling OPI 104 to the ESI source 114. The solvent reservoir 126 (e.g., containing a liquid, desorption solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. A test liquid interface 129, relevant to certain methods described herein, is also depicted coupled to the supply conduit 127. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to the ADE 102 and can be configured to operate any aspect of the ADE 102 (e.g., focusing structures, acoustic ejector 106, automation elements 132 for moving a movable stage 134 so as to position a reservoir 110 into alignment with the acoustic ejector 106, etc.). This enables the ADE 106 to inject droplets 108 into the sampling OPI 104 as otherwise discussed herein substantially continuously or for selected portions of an experimental protocol by way of non-limiting example. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include discrete volumes of liquid samples LS received from each reservoir 110 of the well plate 112. The discrete volumes of liquid samples LS are typically separated from each other by volumes of the solvent S (hence, as flow of the solvent moves the liquid samples LS from the OPI 104 to the ESI source 114, the solvent may also be referred to herein as a transport liquid). The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference between in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

During use of the mass spectrometry device of FIG. 1, the delay time between acoustic ejections affects the throughput rate for analysis of a set of samples, such as samples in a well plate. Accordingly, by decreasing the delay time between ejections (which may be acoustic ejections, drop-on-demand ejections, etc.), the throughput rate can be increased. Reduction of the delay time, however, can cause interference between samples. For instance, if ions from a first sample are still being detected at the same time as ions from the second sample reach the detector, the resulting analysis may be inaccurate. The minimum delay time to avoid the interference between samples depends on multiple factors, including the peak shape (e.g. peak width, fronting/tailing, etc.) as well as the signal dynamic range (from the difference in concentration and/or ejection volume and/or sample matrix) between adjacent ejections. The ejections tested in the present application may be a single droplet ejection from a single well or repeated ejections from the same well. Such ejections (single or multiple) result in a single signal peak in the mass spectrometry analysis.

Among other things, the present technology provides solutions to reduce the delay time between acoustic ejections while reducing the likelihood of interference between samples. To do so, the present technology utilizes predicted or actual intensity relationship between sample signals and adjusts the delay time between ejections accordingly. Predicted intensity signals may be based on one or more factors, such as measured concentrations, relative concentrations (e.g., high or low), sample ejection volume, or sample matrix. This information may be delivered to the mass spectrometry device, for example, by a technician who prepares a sample tray, prior to mass spectrometry analysis. Based on such information about the samples, the delay times between samples may be adjusted. For example, the delay time between ejecting a known high-concentration sample and a known low-concentration sample may be greater than the delay time between ejecting a low-concentration sample and a high-concentration sample. For samples where predicted characteristics are not available, actual intensity signals may be determined by quickly ejecting and analyzing samples to determine if additional delay time is required. Even though these quick ejections may require additional time, by adjusting the required time between ejections needed for a complete mass spectrometry analysis, overall processing time may be saved.

Figure 2:
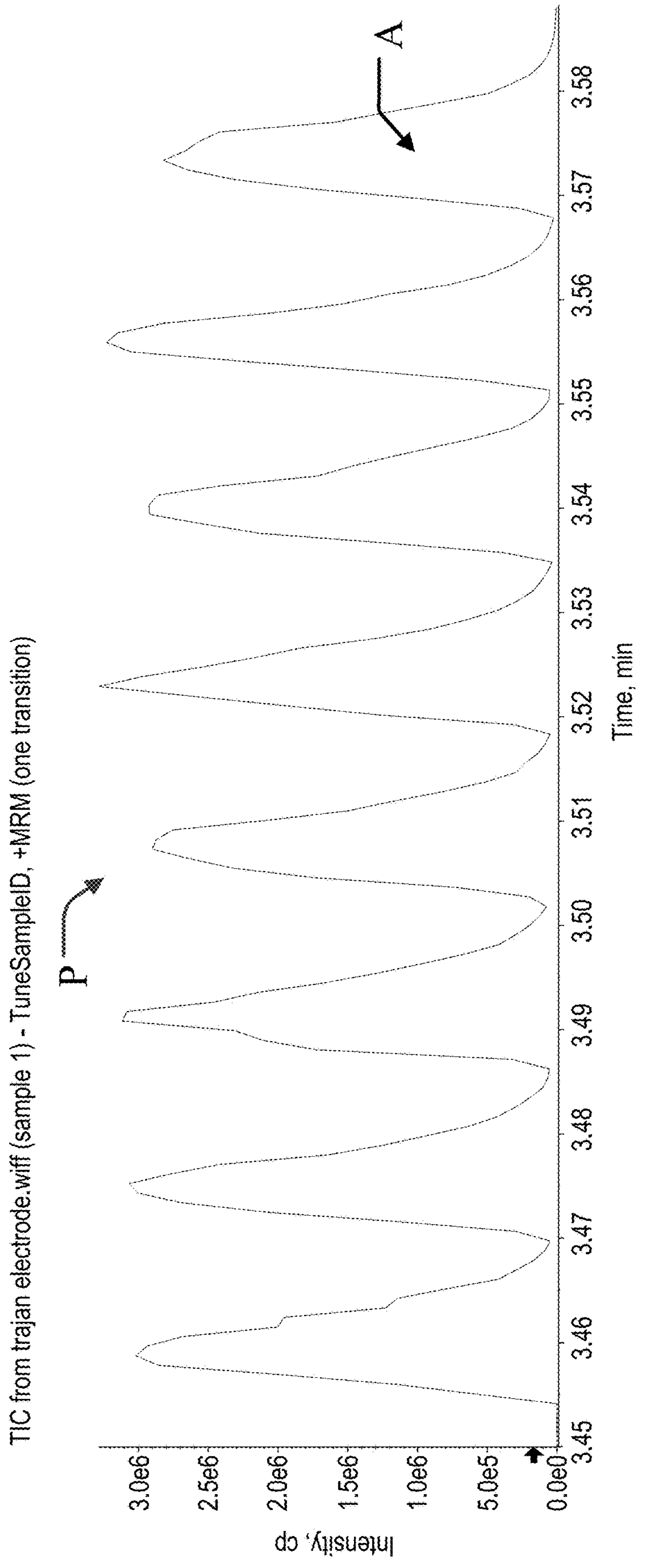
FIG. 2 depicts an ion intensity signal for a number of sample ejections from a well plate.

An example signal plot is depicted in FIG. 2, where the ion intensity signal from eight acoustic ejections from a sample well are shown. Time is depicted along the x-axis and signal intensity (measured in ion count per second) is depicted along the y-axis. The delay time between each ejection is measured between the peak-tops of adjacent peaks. Each ejection is analyzed by the mass analyzer detector and may be characterized by a corresponding peak-top P (a high point of the signal) and a corresponding area (the portion bounded by the shape of the peak). Here, the peak-shape does not change for the particular assay (one characterized by, e.g., fixed target analytes, matrix, carrier solvent, ejection volume, and flowrate). The signal dynamic range (e.g., the difference between adjacent peak heights) between adjacent ejections is another factor determining the minimum necessary ejection delay time between ejections. The shortest delay time, which results in the highest analytical throughput, should satisfy the requirement of accurate quantification for all ejections. This required delay time may be dependent on the signal dynamic range between adjacent ejections, even based on the same peak shape. FIG. 2 depicts a condition where the concentration of the target analyte is similar between adjacent ejections. Under such conditions, a consistent time delay between adjacent ejections (e.g., about a 1 second delay) would be sufficient for accurately quantifying the samples from different ejections, as it allows each peak to be clearly defined and separated from adjacent peaks.

Figure 3A:
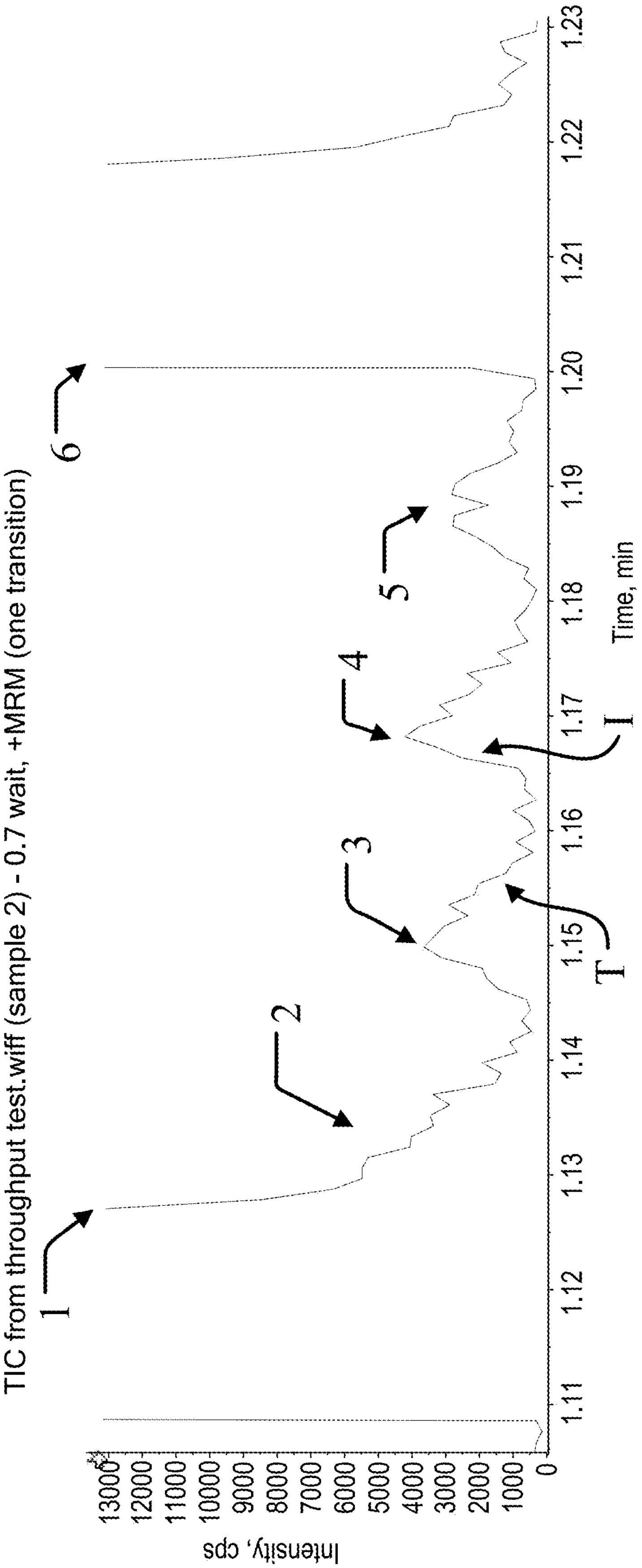
FIGS. 3A-3C depict ion intensity signals for eight sample ejections at various delay times.

However, there are often conditions where the intensity signals of adjacent or consecutive ejections can deviate significantly. Such conditions can be particularly challenging when the signal dynamic range between adjacent ejections is 50, 100, 1000 times, or more. Such a condition is depicted in FIG. 3A, where ion intensity signals for six ejections 1-6 from adjacent ejections are depicted, at an ejection rate of 1.09 seconds per sample. The six ejections may be characterized as high, low, low, low, low, high, thus resulting in the particular displayed signal. The signals also display a tailing peak shape (depicted by T at ejection 3, as opposed to the sharp increase I depicted at ejection 4), though this is not always the case with all mass spectrometry analysis. The tailing peak shape, however, may necessitate additional time delay required between samples of to accommodate the trailing peak shape. This problem may be exacerbated if of a signal is characterized by both a high concentration and a significant tailing peak, as depicted in the condition present at the interference between the signals of ejections 1 and 2. That is, when a sample of a high concentration such as ejection 1, (and with a tailing peak shape) is ejected before a sample of a low concentration such as ejection 2, the absence of a sufficient delay time therebetween results in an inability to distinguish the signals. For instance, the peak for ejection 2 is barely distinguishable from the peak of ejection 1. As such, a longer delay time between ejections should be introduced to accurately quantify the samples. Such delay times can, depending on a number of criteria described herein, be about 0.5 sec., about 1.0 sec., or about 1.5 sec. Even longer delay times may be required when the peak tailing is more severe potentially due to interaction between analyte and the tube surface.

Figure 3B:
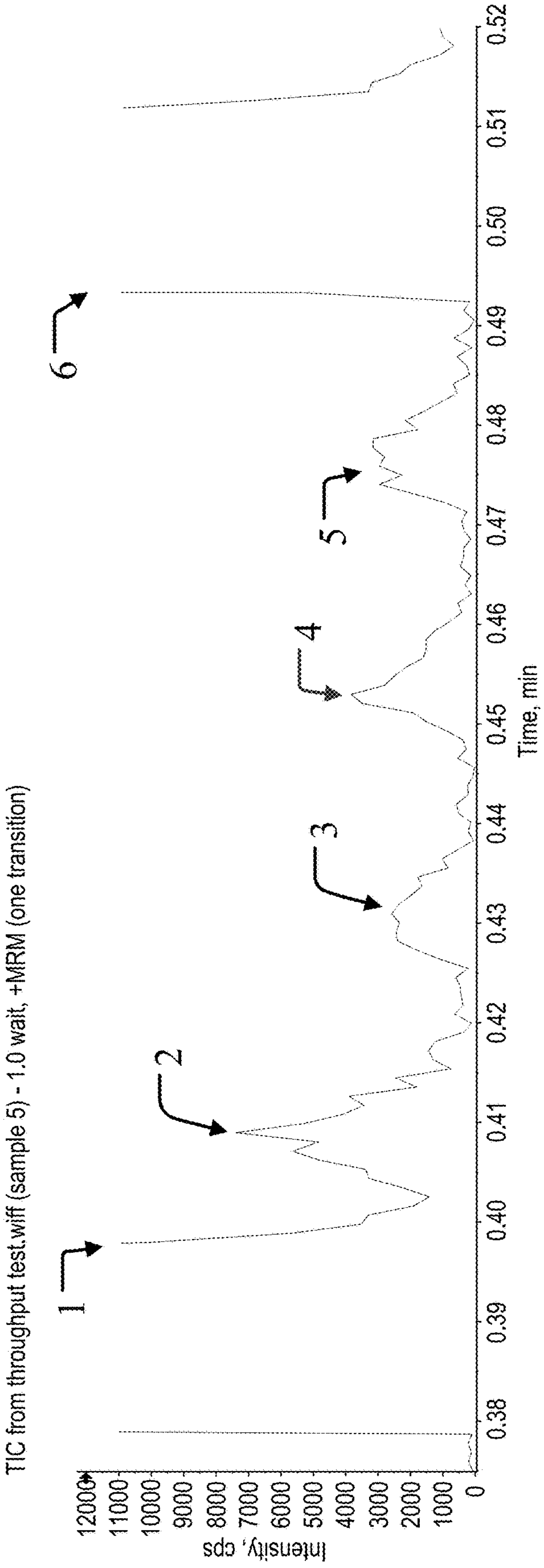

FIG. 3B depicts an increased delay time between ejections 1-6 (at an ejection rate of 1.37 seconds per sample) that is sufficient between ejections 2-5, but still insufficient between ejections 1 and 2, where the tailing shape of the signal of ejection 1 still affects the peak area integration result of the signal of ejection 2. For instance, the peak corresponding to ejection 1 still has a partial overlap with the peak corresponding to ejection 2. Because the intensity signal does not drop to its baseline level between ejection 1 and ejection 2, the detector of the mass analysis instrument is likely detecting ions from ejection 1 at the same as the detector is also detecting ions from ejection 2. Thus, the resulting mass analysis results for ejections 1 and 2 may be inaccurate due that overlap or interference. Accordingly, a greater delay time between ejections 1 and 2 is needed to prevent such interference.

Figure 3C:
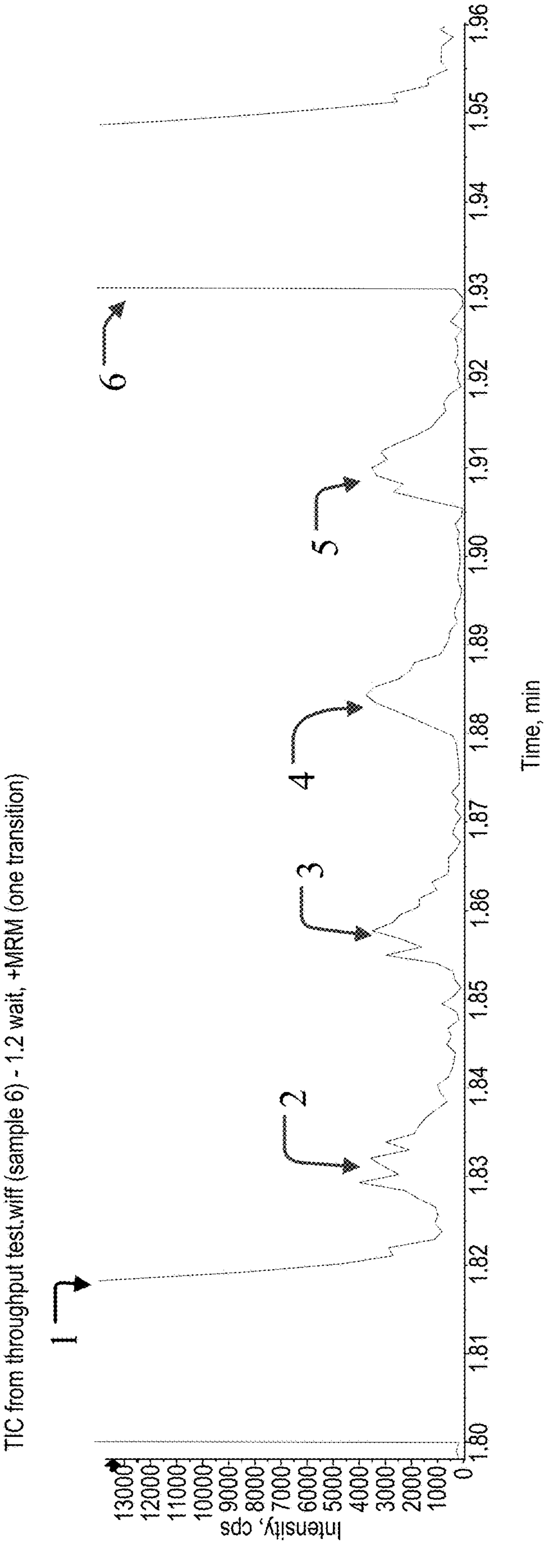

In standard AEMS systems, the acoustic ejection method is the same for an entire run, including the acoustic calibration, carrier solvent flowrate, ejection volume, the ejection delay time, etc. In such a configuration, the delay time is set based on the worst case, as the required delay time for the widest expected signal dynamic range within the assay. FIG. 3C depicts this conservative approach that is safe for quantifying every ejection, specifically ejections 1 and 2. This conservative approach, however, introduces unnecessarily long delays between ejections without a significant signal difference except for ejections 1 and 2. As such, there is a significant (though unnecessary) delay time between ejections 2, 3, 4, and 5 of about 1.56 seconds per sample. Notably, even the delay time between ejection 5 and 6 is adequate, even in view of the tailing peak shape of ejection 5.

The technologies described herein contemplate methods for adjusting dynamically the delay time between samples, so as to reduce or eliminate unnecessary wait times. This can greatly improve the analytical throughput of a mass analysis system. The delay time may be dynamically adjusted according to predicted or predetermined signal information of adjacent ejections which relate to concentrations of the samples within each well. For example, a longer ejection delay time will be added between the sequence of high expected signal followed by the low expected signal. A shorter ejection delay time would be enough for the adjacent ejections with similar concentrations, and for a low expected signal followed by a higher expected signal. A longer ejection delay time may also added due to the presence of a tailing peak shape of a signal.

Figure 4:
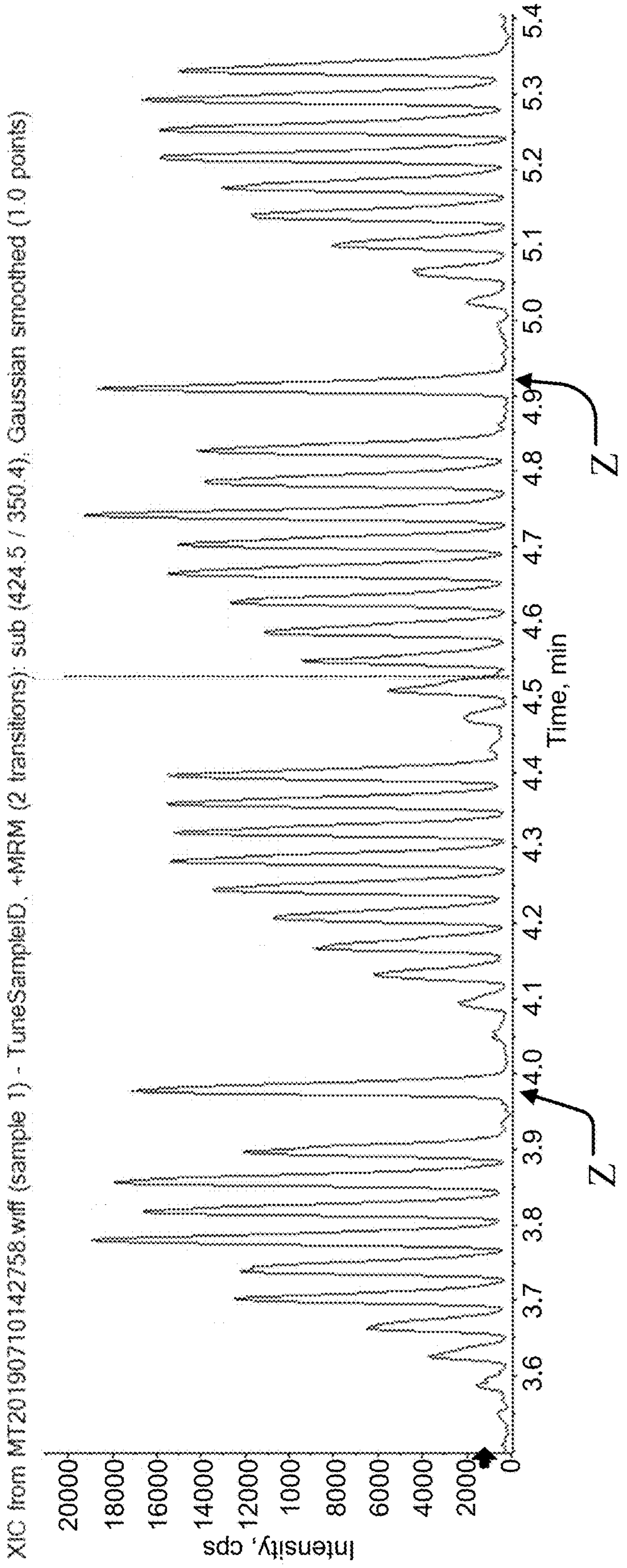
FIG. 4 depicts ion intensity signals for a number of sample ejections from a well plate.

Several approaches to achieve the results are contemplated to generate the information about the predicted or actual signal relationship of adjacent ejections. For example, for some stability assays and dose-response activity screenings, the sample plate is arranged typically from low concentration to high concentration, or at least similar concentration within a given group. FIG. 4 depicts a condition where an inhibition drug concentration changes from high to low within a sample set. An increase in delay time would only be required where a high signal is followed by a significant lower signal. Typically, this would occur at the group switching point, or right after the zero percent effect (ZPE) control sample, depicted in FIG. 4 at locations Z. In other assays, ZPE and hundred percent effect (HPE) are placed in two separate columns of the plate as the built-in controls.

Figure 5:
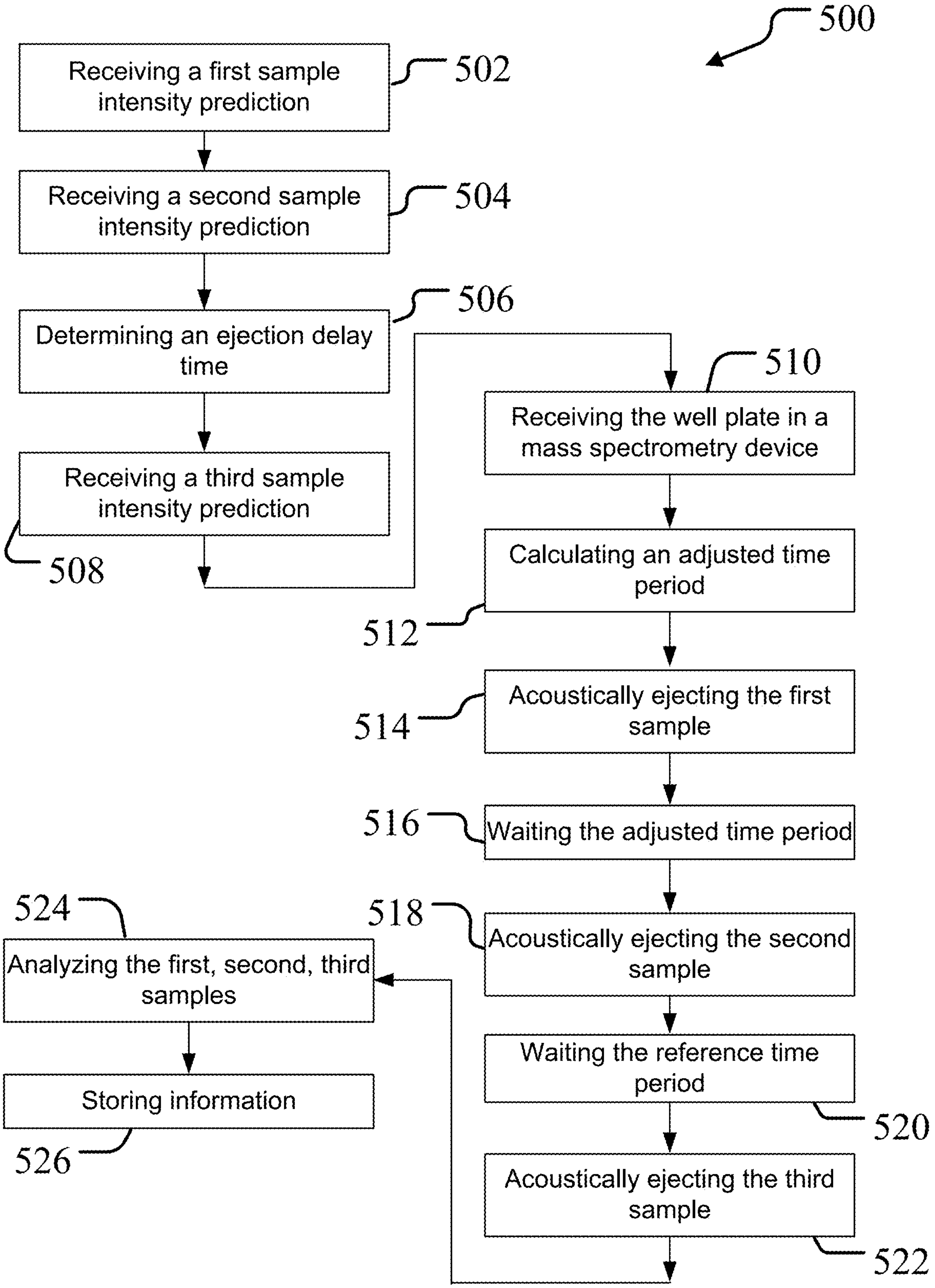
FIG. 5 depicts a method of ejecting a plurality of samples from a well plate.

A method 500 of controlling ejections from samples of a well plate is described in more detail in FIG. 5. The method contemplates the situation described above, where the signal intensity of each sample well may be predicted (e.g., from preparation of the well plate). These signal intensities may be either relative or measured. For illustrative purposes, the method 500 contemplates the signal intensity of the first sample to be higher than the signal intensity of the second sample, and the signal intensity of the third sample to be greater than or equal to that of the second sample. Well trays having any particular order of predicted sample signal intensities may be analyzed in accordance with modified versions of this method 500, however, as will be apparent to a person of skill in the art upon reading the following description.

The method 500 begins with receiving a first sample intensity prediction associated with a first sample in a first well of the well plate, operation 502. This sample intensity prediction may be input by a user of a mass spectrometry device that will be used to analyze the samples in the well plate. In operation 504, a second sample intensity prediction associated with a second sample in a second well of the well plate is received. Again, as noted above, for purposes of illustration, the second sample intensity prediction is less than the first sample intensity prediction. With this high first sample intensity prediction and a comparatively low second sample intensity prediction, an ejection time delay value for a subsequent analysis of the first sample and the second sample may be determined, operation 506. This determination is based at least in part on the first and second sample intensity predictions. Further optional operations may be performed, for example, if three, four, or more samples are utilized. For example, operation 508 includes receiving a third sample intensity prediction associated with a third sample in a third well of the well plate and, as noted above, the third sample intensity prediction is greater than or equal to the second sample intensity prediction. With these three sample intensity predictions known, subsequent analysis of the first, second, (and third or more samples, if present) may be performed.

That analysis begins with operation 510, where the well plate containing the first, second, and third samples (in first, second, and third wells, respectively) is received in a mass spectrometry device. In preparation for a processing of the well plate having the first, second, and third samples, operation 512 includes calculating an adjusted time period. The adjusted time period is based at least in part on a reference time period and the determined ejection delay time value from operation 506. The reference time period may be the shortest required delay time between sample ejections where additional delay time (the determined ejection delay time) is not required; that is, a sample of a known sample intensity followed by a sample of a sample intensity greater than or equal to the known sample intensity. The method 500 continues with operation 514, acoustically ejecting the first sample from the first well. As an increased delay time is required before ejecting the second sample, the method includes operation 516, waiting for the adjusted time period to elapse. Thereafter, operation 518, acoustically ejecting the second sample from the second well, is performed. In this example, since it is known that the third sample has a sample intensity greater than or equal to the second sample intensity, operation 520, waiting for the reference time period to elapse, is performed. Thereafter, the method 500 continues with operation 522, acoustically ejecting the third sample from the third well, is performed.

Further ejections may be repeated for additional samples from additional wells of the well tray. The delay time between each is dictated by factors that include the relative sample intensities between adjacent ejections, or the presence of a tailing peak shape. With regard to the latter, as an example, high concentration ejections followed by low concentrations require a delay characterized by the adjusted time period, while low concentration ejections followed by equal or greater concentration ejections require a delay only characterized by the reference time period. Continuing with method 500, the first, second, and third samples (as well as any additional samples) are then analyzed, operation 524. Respective ion intensity signals may be obtained from the analysis. Operation 526 may also be performed, which includes storing information obtained from the analysis. This information may include the sample intensity prediction(s), reference time period, ejection time delay, adjusted time period, resulting ion intensity signal(s), etc. All of this information may be saved and stored for future reference and quality control. For example, if the information indicates a discrepancy between the received information (e.g., between a low second sample intensity prediction and a high third sample intensity prediction) and the analyzed ion intensity signal (indicative of high second sample intensity prediction and a low third sample intensity prediction), the well plate may be re-analyzed.

Figure 6:
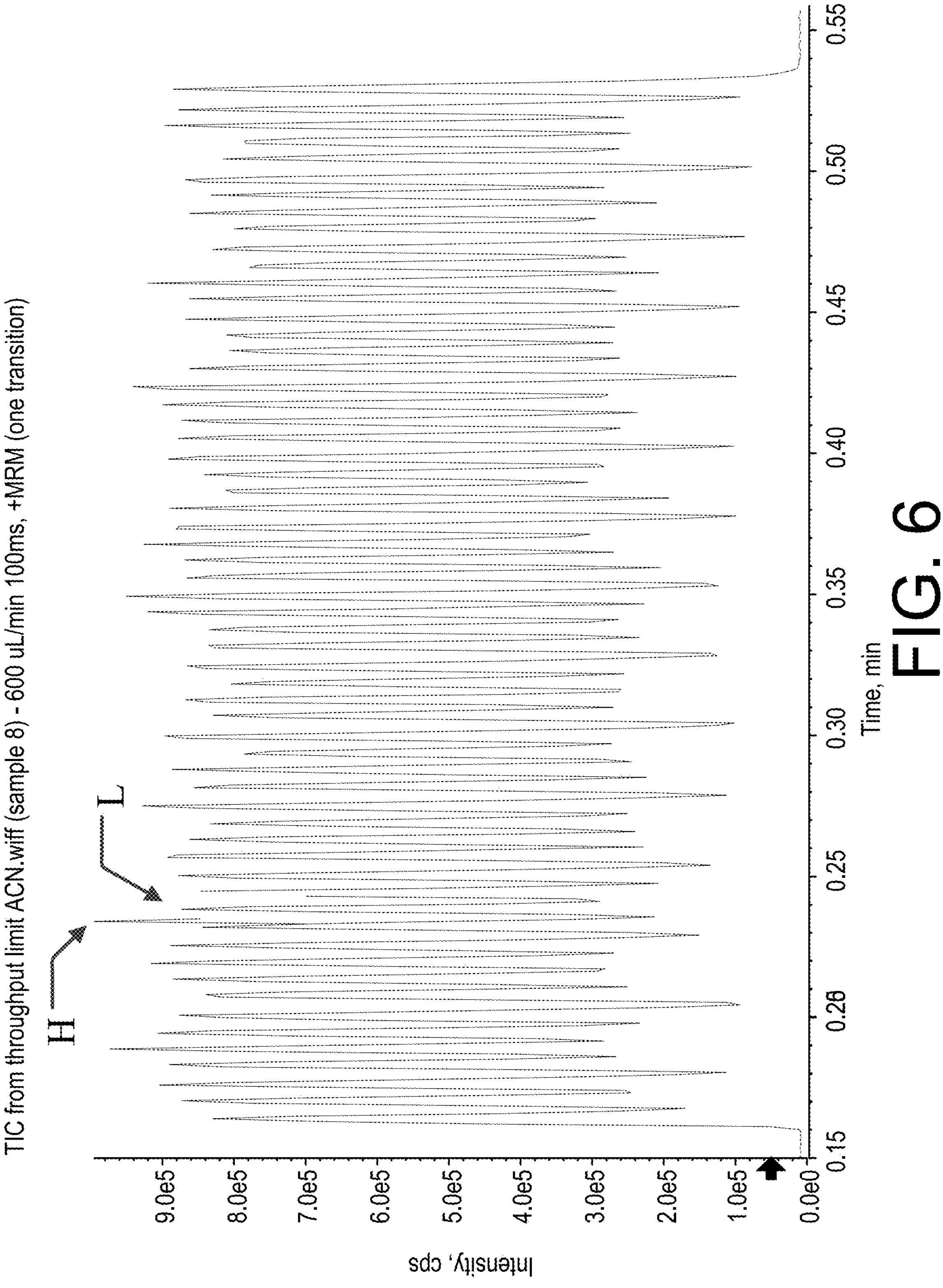
FIG. 6 depicts ion intensity signals for a number of sample ejections from a well plate.

While the method 500 of FIG. 5 is useful for well plates where measured or relative intensities may be predicted, such conditions do not always exist. As such, another method to predict the relative signal level relationship is to have a pre-run of a well plate with much higher throughput (e.g., 3-4 ejections per second). One purpose of this pre-run is to quickly scan and identify the situations of high signal followed by a significantly lower signal (further, for the tailing peak-shape case) where a longer ejection delay time would be needed to be added in the actual analysis run. For the pre-run, since the purpose was not to actually quantify the mass characteristics of the analytes from every well, a partial overlap of the ion intensity signal from adjacent ejections would be acceptable at a rate of 3 ejections per second, 4 ejections per second, or more. The ion intensity signal from a pre-run at 3 ejections per second is depicted in FIG. 6. Also, while this pre-run approach consumes some analytical time in addition to the analysis run, the overall throughput may nevertheless be faster for some assays with a significant tailing peak shape. With the results from the pre-run, the extra delay time could be added between ejections of samples of high signal S followed by the low signal L. Alternatively, the ejection sequence for the full analysis could be re-arranged where low signal wells are ejected before high signal wells, allowing for only the short delay time to be used between all ejections.

Figure 7:
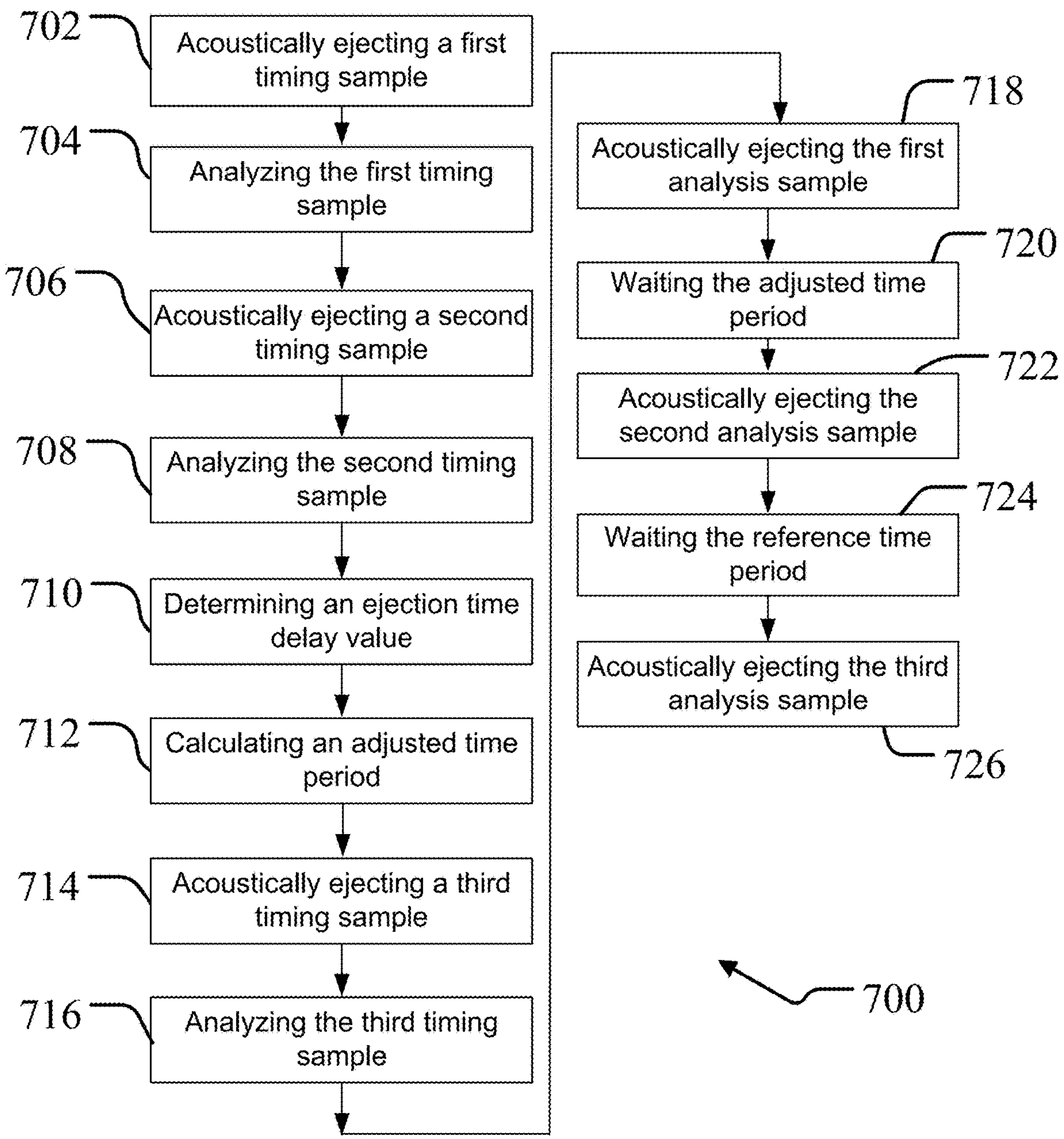
FIG. 7 depicts another method of ejecting a plurality of samples from a well plate.

FIG. 7 depicts such a method 700 that performs a method of ejecting a plurality of samples from a well plate, for example as a fast pre-run. The method 700 begins with operation 702, acoustically ejecting a first timing sample from a first well of a well plate. The method continues to operation 704, analyzing the first timing sample with a mass spectrometry device to determine a first ion intensity signal. The term “timing sample,” and the “analysis” thereof, in the context of the method 700 of FIG. 7 refers to a sample ejected from a well plate that is not analyzed as part of an analytical work-up; indeed, at an ejection frequency of 3-4 Hz (or higher) contemplated for ejections from a well plate, such rapid ejections may are significantly shorter than elapsed time between sample ejections that will actually be analyzed. Rather, the analysis of the timing sample is performed to calculate a delay time between a subsequent “analysis sample” ejected from the same well plate. This analysis sample may be subject to a full analysis work-up. The method continues with operation 706, acoustically ejecting a second timing sample from a second well of the well plate, which is performed subsequent to ejecting the first timing sample. This second timing sample is analyzed with the mass spectrometry device to determine a second ion intensity signal, in operation 708. As with the illustrative method 500 of FIG. 5, the second ion intensity signal is less than the first ion intensity signal, the ion intensity signals being indicative of the concentrations of the samples in each well. Thereafter, operation 710 includes determining an ejection time delay value for performing a subsequent analysis of a first analysis sample from the first well and a second analysis sample from the second well. The ejection time delay value may be based at least in part on the second ion intensity signal. With this ejection time delay value, an adjusted time period may be calculated, operation 712. The adjusted time period may be based on a reference time period and the ejection delay time value, in one example, the sum thereof. The reference time period may be a predetermined time period typical for well plate analysis and may be set by the manufacturer or user, based on the contents of the sample wells, best practices, etc.

Additional timing samples may be ejected and analyzed, though only acoustically ejecting a third timing sample from a third well of the well plate, operation 714, and analyzing the third timing sample with the mass spectrometry device to determine a third ion intensity signal, operation 716, are depicted. As with the method 500 of FIG. 5, the third ion intensity signal is greater than or equal to the second ion intensity signal, and as such, requires no ejection time delay. Thus, the time period determined between the second analysis sample and the third analysis sample may correspond only to the reference time period. With timing samples from the wells of the well plate ejected and analyzed, a detailed analytical work-up may now be performed.

The analysis aspect of the method 700 begins at operation 718, acoustically ejecting the first analysis sample from the first well. A subsequent ejection is delayed until the adjusted time period elapses, operation 720, after which the second analysis sample is acoustically ejected from the second well, operation 722. Thereafter, the method 700 waits for the reference time period to elapse, operation 724, before acoustically ejecting the third analysis sample from the third well. The various ion intensity signals for each analysis sample may then be generated, analyzed, evaluated, stored, etc.

Figure 8:
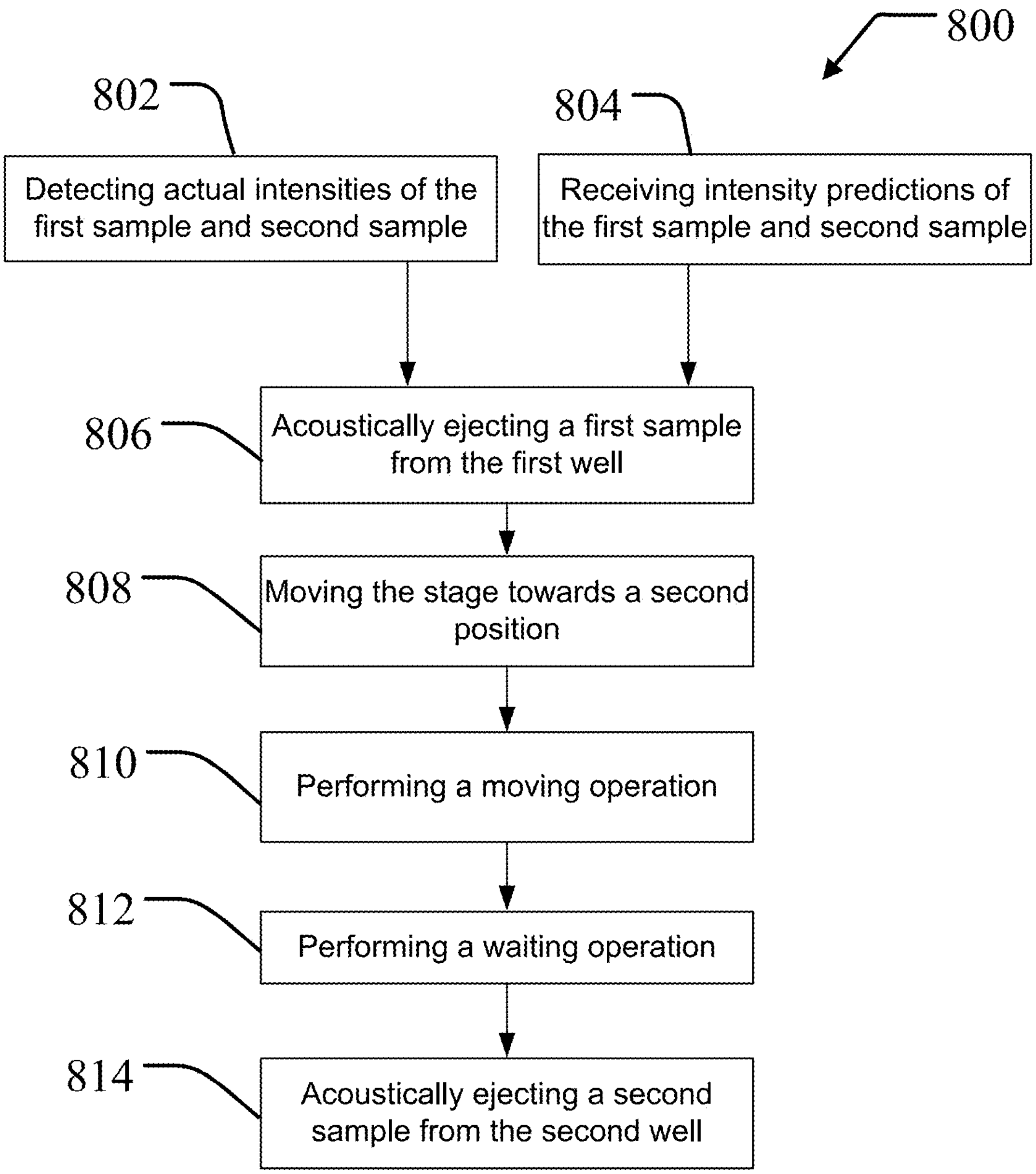
FIG. 8 depicts a method of operating a mass spectrometry device.

The mass spectrometry device depicted in FIG. 1 includes a movable stage that moves the well plate relative to the ADE and OPI. The movement of the stage may be adjusted to accommodate the various delay times required for proper analysis of the well plate samples. FIG. 8 depicts a method 800 that contemplates movement of the stage to accommodate these delay times. Method 800 begins with either of operation 802 or 804. Operation 802 includes detecting with the detector, the actual intensity of the first sample and the actual intensity of the second sample. This may be performed in a timing operation such as depicted above in FIG. 7. Operation 804, however, includes receiving the intensity prediction of the first sample and the intensity prediction of the second sample. This is consistent with a well tray of predicted intensity signals, such as depicted in FIG. 5. The method continues with acoustically ejecting a first sample from a first well of the well plate, with the movable stage positioned at a first position relative to the OPI, operation 806. Thereafter, the stage moves towards a second position relative to the OPI, operation 808. This movement operation may include two sub-operations, namely, performing a moving operation, operation 810, and performing a waiting operation, operation 812. In other examples, the waiting operation 812 may be performed prior to the moving operation 810. This movement may occur over the course of the time period required between ejections, which may be longer, if moving from a well of higher intensity signal to a well of lower intensity signal, or shorter, if moving from a well of lower intensity signal to one of equal or higher intensity signal. That time period between the acoustic ejections is based at least in part on an intensity signal of the first sample and an intensity signal of the second sample. In one example, the moving operation is longer than the waiting operation; in another example, the moving operation is shorter than the waiting operation. Thereafter, operation 814, acoustically ejecting a second sample from a second well of the well plate is performed with the well plate in the second position.

Figure 9:
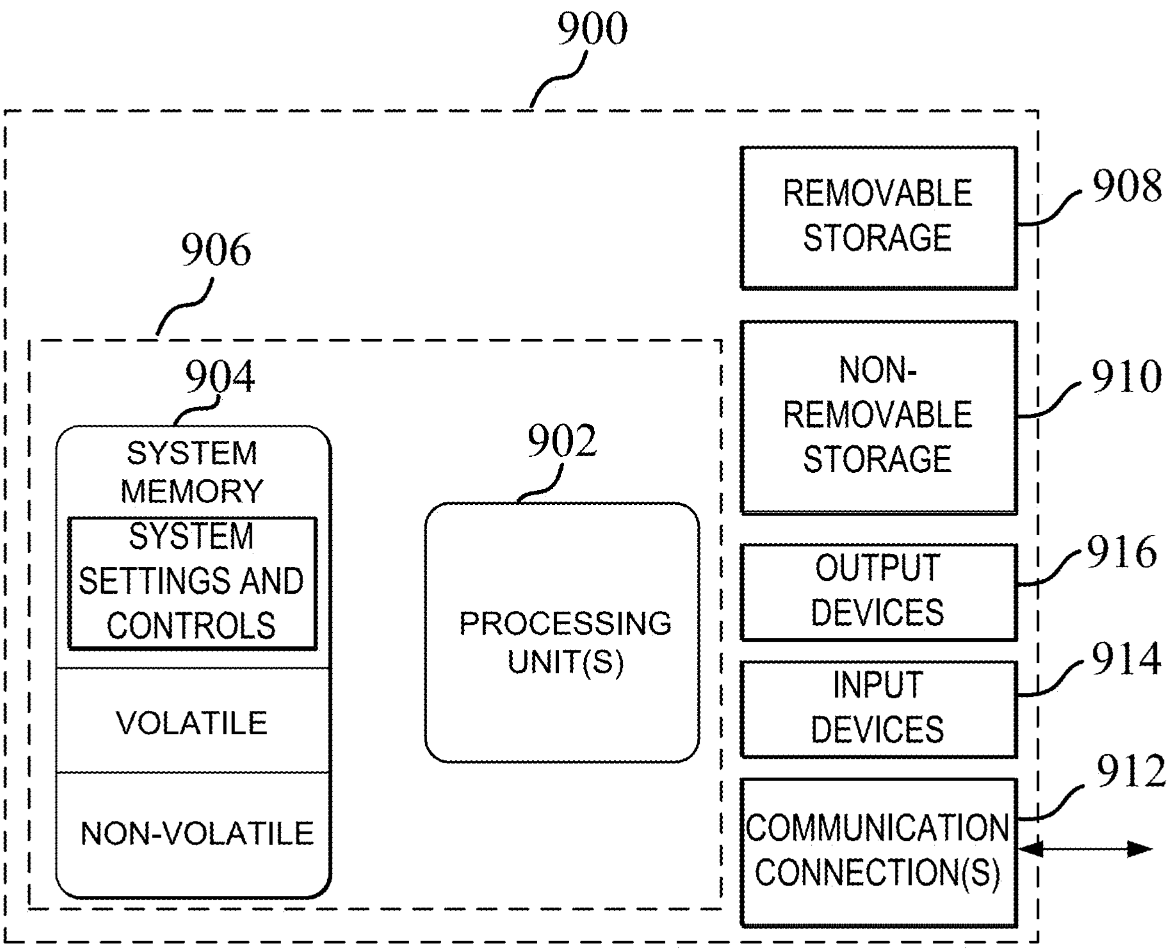
FIG. 9 depicts an example of a suitable operating environment in which one or more of the present examples can be implemented.

FIG. 9 depicts one example of a suitable operating environment 900 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, instructions to control the eject the samples, move the stage, or perform other methods disclosed herein) can be volatile (such as RAM), non-volatile (such as ROM, flash memory, etc.), or some combination of the two. This most basic configuration is illustrated in FIG. 9 by dashed line 906. Further, environment 900 can also include storage devices (removable, 908, and/or non-removable, 910) including, but not limited to, magnetic or optical disks or tape. Similarly, environment 900 can also have input device(s) 914 such as touch screens, keyboard, mouse, pen, voice input, etc., and/or output device(s) 916 such as a display, speakers, printer, etc. Also included in the environment can be one or more communication connections 912, such as LAN, WAN, point to point, Bluetooth, RF, etc.

Operating environment 900 typically includes at least some form of computer readable media. Computer readable media can be any available media that can be accessed by processing unit 902 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 900 is part of a network that stores data in remote storage media for use by the computer system 900.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of ejecting a plurality of samples from a well plate, the method comprising:

receiving a first sample intensity prediction associated with a first sample in a first well of the well plate;

receiving a second sample intensity prediction associated with a second sample in a second well of the well plate acoustically ejecting the first sample from the first well;

determining an ejection time delay value based on the first sample intensity prediction and the second sample intensity prediction; and after acoustically ejecting the first sample, acoustically ejecting the second sample from the second well after a time period based on the ejection time delay value.

2. The method of claim 1, further comprising receiving the well plate in a mass spectrometry device.

3. The method of claim 1, further comprising calculating an adjusted time period, wherein the adjusted time period is based at least in part on a reference time period and the ejection delay time value.

4. The method of claim 3, wherein acoustically ejecting the second sample is performed after the adjusted time period elapses.

5. The method of claim 1, further comprising:

receiving a third sample intensity prediction of a third sample intensity signal associated with a third sample in a third well of the well plate, wherein the third sample intensity prediction is at least one of greater than and equal to the second sample intensity prediction.

6. The method of claim 5, further comprising after acoustically ejecting the second sample, acoustically ejecting the third sample from the third well, wherein ejecting the third sample is performed after a reference time period elapses.

7. The method of claim 1, wherein the first sample intensity prediction is indicative of a first concentration of the first sample in the first well of the well plate and the second sample intensity prediction is indicative of a second concentration of the second sample in the second well of the well plate.

8. The method of claim 1, further comprising storing, in a memory coupled to a mass spectrometry device, the first sample intensity prediction.

* * * * *